United States Patent
Tao et al.

(10) Patent No.: US 9,667,156 B2
(45) Date of Patent: May 30, 2017

(54) POWER SUPPLY WITH LINE COMPENSATION CIRCUIT

(71) Applicant: FAIRCHILD SEMICONDUCTOR CORPORATION, San Jose, CA (US)

(72) Inventors: Zhibo Tao, Palo Alto, CA (US); David Kunst, Cupertino, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/046,256

(22) Filed: Feb. 17, 2016

(65) Prior Publication Data

US 2016/0261196 A1    Sep. 8, 2016

Related U.S. Application Data

(60) Provisional application No. 62/129,257, filed on Mar. 6, 2015.

(51) Int. Cl.
*H02M 3/335* (2006.01)
*H02M 1/00* (2006.01)

(52) U.S. Cl.
CPC ............ *H02M 3/33507* (2013.01); *H02M 2001/0009* (2013.01)

(58) Field of Classification Search
CPC ......... H02M 3/33507; H02M 3/33523; H02M 3/33515; H02M 3/335; H02M 3/1563; H02M 3/3385; H02M 3/33561; H02M 3/33592; H02M 3/157; H02M 3/1584; H02M 7/066; H02M 7/219; H02M 7/12; H02M 7/217; H02M 7/068; H02M 7/06; H02M 7/10; H02M 1/32; H02M 1/4208; H02M 1/4225; H02M 2001/0032; H02M 5/4585
USPC ............. 363/21.12, 21.15, 21.17–21.18, 76, 363/81–82, 89, 125–127
See application file for complete search history.

(56) References Cited

U.S. PATENT DOCUMENTS

| | | |
|---|---|---|
| 3,938,490 A | 2/1976 | Snyder et al. |
| 6,144,187 A | 11/2000 | Bryson |
| 6,344,980 B1 | 2/2002 | Hwang et al. |
| 6,469,914 B1 | 10/2002 | Hwang et al. |
| 6,927,599 B2 | 8/2005 | Ju et al. |
| 7,154,307 B2 | 12/2006 | Pradhan et al. |
| 7,683,693 B2 | 3/2010 | Garrett |
| 7,710,084 B1 | 5/2010 | Guo |
| 7,764,054 B1 | 7/2010 | Guo et al. |
| 7,863,875 B1 | 1/2011 | Guo et al. |
| 7,876,587 B2 | 1/2011 | Balakrishnan et al. |
| 8,610,415 B2 | 12/2013 | Maher et al. |
| 8,947,896 B2 | 2/2015 | Dunipace |
| 9,273,626 B2 | 3/2016 | Gillberg |

(Continued)

*Primary Examiner* — Jue Zhang
*Assistant Examiner* — Kevin H Sprenger
(74) *Attorney, Agent, or Firm* — Okamoto & Benedicto LLP (57) ABSTRACT

A line compensation circuit for a power supply includes a line voltage sense circuit and a current limit adjuster. The line voltage sense circuit senses a slope of an inductor current by way of a compensation capacitor that receives a sense voltage that is representative of the inductor current on a primary side of the power supply. A compensation current that is generated from the compensation capacitor is used by the current limit adjuster to adjust an output current limit of the power supply.

20 Claims, 6 Drawing Sheets

(56) References Cited

U.S. PATENT DOCUMENTS

| | | | | |
|---|---|---|---|---|
| 2005/0024898 A1* | 2/2005 | Yang | H02M 3/33507 | 363/21.12 |
| 2006/0284567 A1* | 12/2006 | Huynh | H02M 3/33507 | 315/246 |
| 2009/0040796 A1* | 2/2009 | Lalithambika | H02M 3/33507 | 363/21.17 |
| 2013/0027815 A1* | 1/2013 | Gaknoki | H02M 1/32 | 361/18 |
| 2016/0087542 A1* | 3/2016 | Warnes | H02M 1/32 | 363/21.05 |

* cited by examiner

POWER SUPPLY WITH LINE COMPENSATION CIRCUIT

CROSS-REFERENCE TO RELATED APPLICATION

This application claims the benefit of U.S. Provisional Application No. 62/129,257, filed on Mar. 6, 2015, which is incorporated herein by reference in its entirety.

BACKGROUND OF THE INVENTION

1. Field of the Invention

The present invention relates generally to electrical circuits, and more particularly but not exclusively to line compensation circuits for power supplies.

2. Description of the Background Art

A power supply may receive an input alternating current (AC) line voltage on a primary side to generate a regulated direct current (DC) output voltage on a secondary side. The power supply may include a primary-side current sense circuit to estimate the output current on the secondary side for regulation and to limit output power. For example, an inductor current on the primary side may be sensed to estimate the output current. One problem with primary-side current sensing is that the sensed peak inductor current may not accurately reflect an actual peak inductor current due to turn-off propagation delay of a main switch on the primary side.

SUMMARY

In one embodiment, a line compensation circuit for a power supply includes a line voltage sense circuit and a current limit adjuster. The line voltage sense circuit senses a slope of an inductor current by way of a compensation capacitor that receives a sense voltage that is representative of the inductor current on a primary side of the power supply. A compensation current that is generated from the compensation capacitor is used by the current limit adjuster to adjust an output current limit of the power supply.

These and other features of the present invention will be readily apparent to persons of ordinary skill in the art upon reading the entirety of this disclosure, which includes the accompanying drawings and claims.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
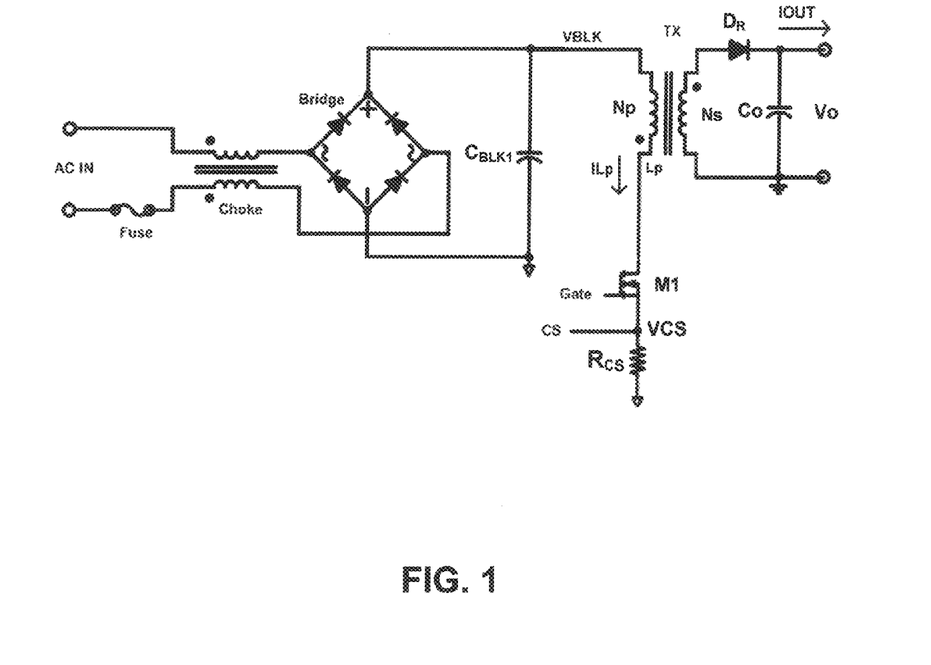
FIG. 1 shows an example power supply that may incorporate embodiments of the present invention.

FIG. 1 shows an example power supply that may incorporate embodiments of the present invention. The power supply of FIG. 1 has an off-line flyback converter topology for illustration purposes only. It should be noted that embodiments of the present invention may also be employed in other power supply topologies.

In the example of FIG. 1, a bridge rectifier rectifies an input AC line voltage to a rectified voltage, which is filtered by an input capacitor CBLK1 to generate an input voltage VBLK on one end of a primary winding NP of a transformer TX. The other end of the primary winding NP is connected to a switch element, which is a metal oxide semiconductor field effect transistor (MOSFET) M1 in this example. The gate of the transistor M1 may be controlled to generate a primary-side inductor current ILP through the primary winding NP. The inductor current ILP induces current on the secondary winding NS of the transformer TX. The secondary side of the power supply includes an output circuit comprising an output diode DR and an output capacitor CO. The induced current on the secondary side is used to charge the output capacitor CO and generate an output voltage VO. A load (not shown) is connected to the power supply to receive the output voltage VO and corresponding output current IOUT.

The power supply of FIG. 1 includes other components that are not relevant to the present disclosure, such as a feedback circuit and a controller for controlling the switching operation of the transistor M1 to regulate the output voltage VO. These and other well-known components may be implemented using conventional circuits and are accordingly not shown for clarity of illustration.

In the example of FIG. 1, primary side-current sensing is employed to estimate the output current IOUT for regulation purposes and/or to limit the output power. For example, the output current IOUT may be estimated from the inductor current ILP, which may be sensed from a sense voltage VCS developed on a sense resistor RCS by the inductor current ILP when the transistor M1 is turned ON. One problem with primary-side current sensing is that a peak inductor current IPK sensed from the sense resistor RCS does not accurately reflect an actual peak inductor current IPK,Real of the inductor current ILP because of the turn-off delay of the transistor M1. This problem is further illustrated with reference to the waveforms of FIG. 2.

Figure 2:
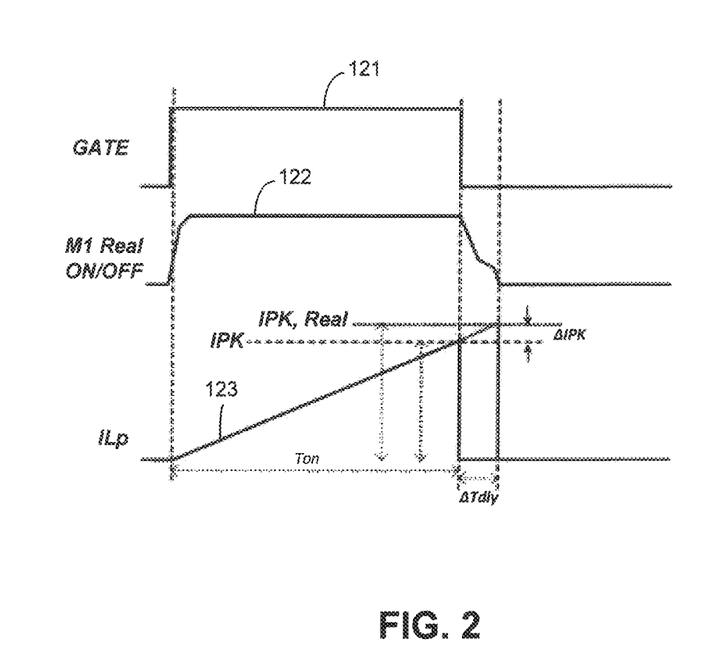
FIG. 2 shows waveforms that illustrate the difficulty of sensing real inductor current from a primary side of a power supply.

FIG. 2 shows, from top to bottom, waveforms of an ideal gate drive signal at the gate of the transistor M1 (plot 121), the actual gate drive signal at the gate of the transistor M1 (plot 122), and the resulting inductor current ILP on the primary side (plot 123). In FIG. 2, $\Delta$IPK is the difference between the actual peak inductor current IPK,Real and the sensed peak inductor current IPK of the inductor current ILP. Referring to FIG. 2, $$IPK = \frac{VBLK}{Lp} \cdot \text{Ton} \qquad \text{(EQ. 1)}$$

$$\Delta IPK = \frac{VBLK}{Lp} \cdot \Delta Tdly \qquad \text{(EQ. 2)}$$

$$IPK, \text{Real} = IPK + \Delta IPK \qquad \text{(EQ. 3)}$$

where Ton is the on-time of the transistor M1, ΔTdly is the turn-off delay of the transistor M1, LP is the inductance of the primary winding NP, and ΔIPK is the difference between the sensed and actual peak inductor currents of the inductor current ILP. Note that the difference between the sensed peak and actual peak of the inductor current ILP is due to the delay in turning off the transistor M1.

Figure 3:
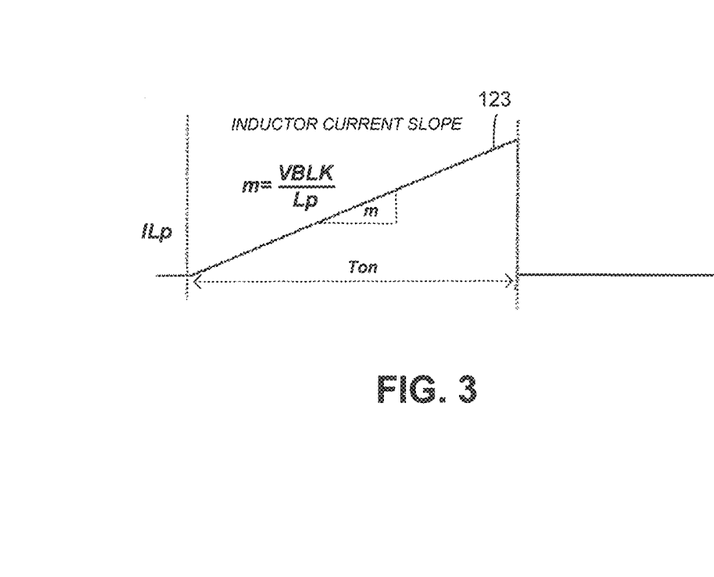
FIG. 3 shows a waveform of an inductor current.

As illustrated in FIG. 3, the slope m of the inductor current ILP (plot 123) is equal to the input voltage VBLK on the primary winding NP divided by the inductance LP of the primary winding NP. Because the slope of the inductor current ILP varies with the input voltage VBLK and the inductance LP, the turn-off delay ΔTdly of the transistor M1 induces ΔIPK, which varies with the slope of the inductor current ILP. The error in sensing the peak of the inductor current ILP causes output current regulation or input power limit to vary with the input AC line voltage and/or the input voltage VBLK, which is generated from the AC line voltage. In this disclosure, the term "line compensation" refers to compensating for variation of the AC line voltage and/or the input voltage VBLK.

Figure 4:
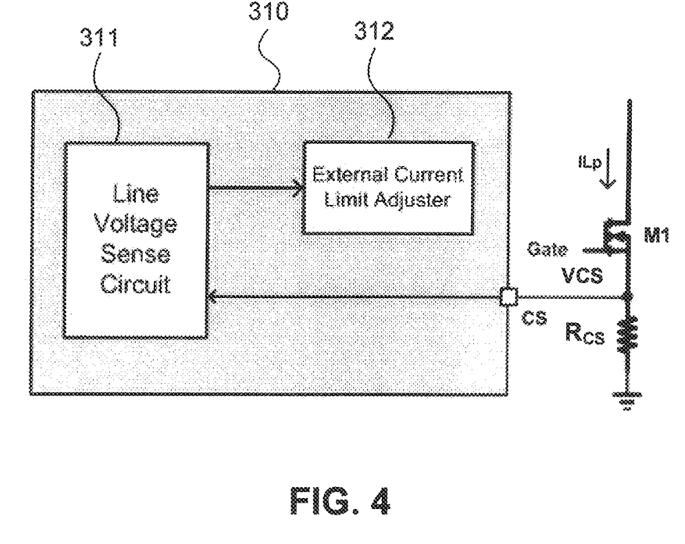
FIG. 4 shows a schematic diagram of a line compensation circuit in accordance with an embodiment of the present invention.

FIG. 4 shows a schematic diagram of a line compensation circuit 310 in accordance with an embodiment of the present invention. The line compensation circuit 310 may comprise a line voltage sense circuit 311 and an external current limit adjuster 312. The line compensation circuit 310 may be implemented in an integrated circuit that includes the line voltage sense circuit 311 and the external current limit adjuster 312. As can be appreciated, the line compensation circuit 310 may also be implemented as a discrete circuit or a combination of discrete and integrated circuits.

The current limit adjuster 312 is "external" in that it may be, but not necessarily, external from the line voltage sense circuit 311. In one embodiment, the current limit adjuster 312 adjusts a current limit of the power supply (FIG. 1, IOUT) based on a compensation current that is indicative of a slope of the inductor current ILP. In one embodiment, the current limit adjuster 312 adjusts a turn-off of the transistor M1 based on the compensation current.

In the example of FIG. 4, the line compensation circuit 310 is employed in the power supply of FIG. 1. As can be appreciated, the line compensation circuit 310 may also be employed in other power supplies. In the example of FIG. 4, the line voltage sense circuit 311 receives the sense voltage VCS developed on the sense resistor RCS by the inductor current ILP when the transistor M1 is turned on (see also FIG. 1). For example, the line compensation circuit 310 may be implemented as an integrated circuit with a CS pin for receiving the sense voltage VCS.

Figure 5:
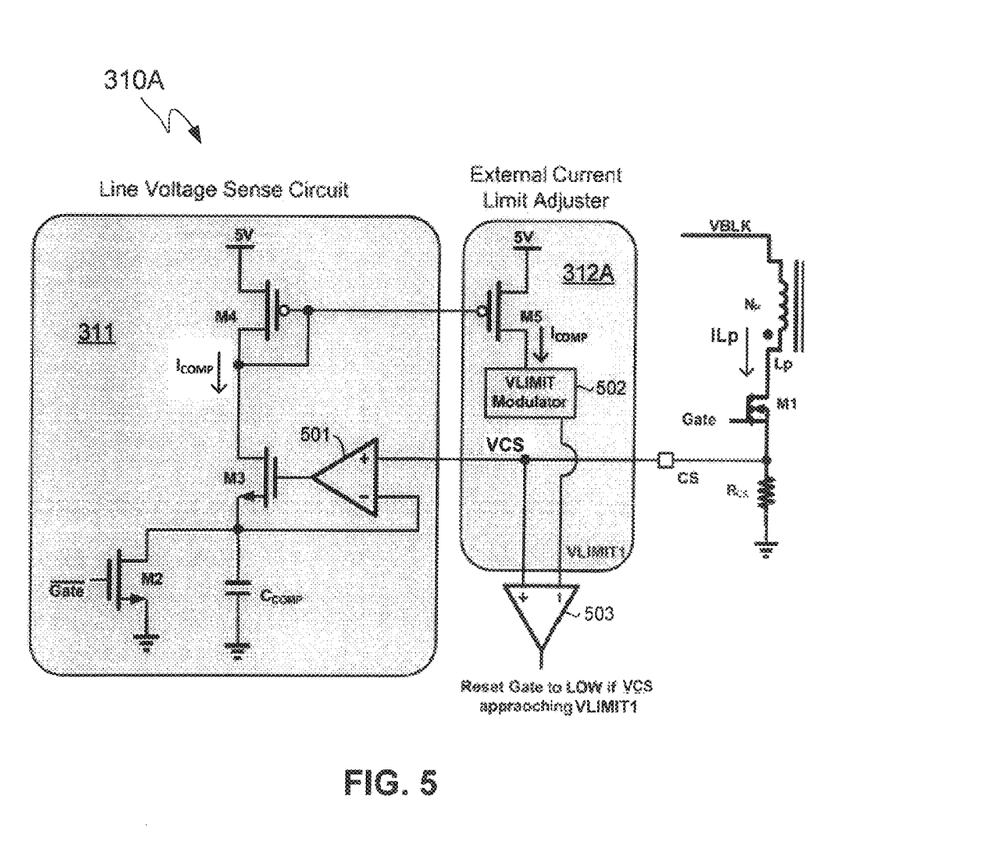
FIG. 5 shows a schematic diagram of a line compensation circuit in accordance with an embodiment of the present invention.
Figure 7:
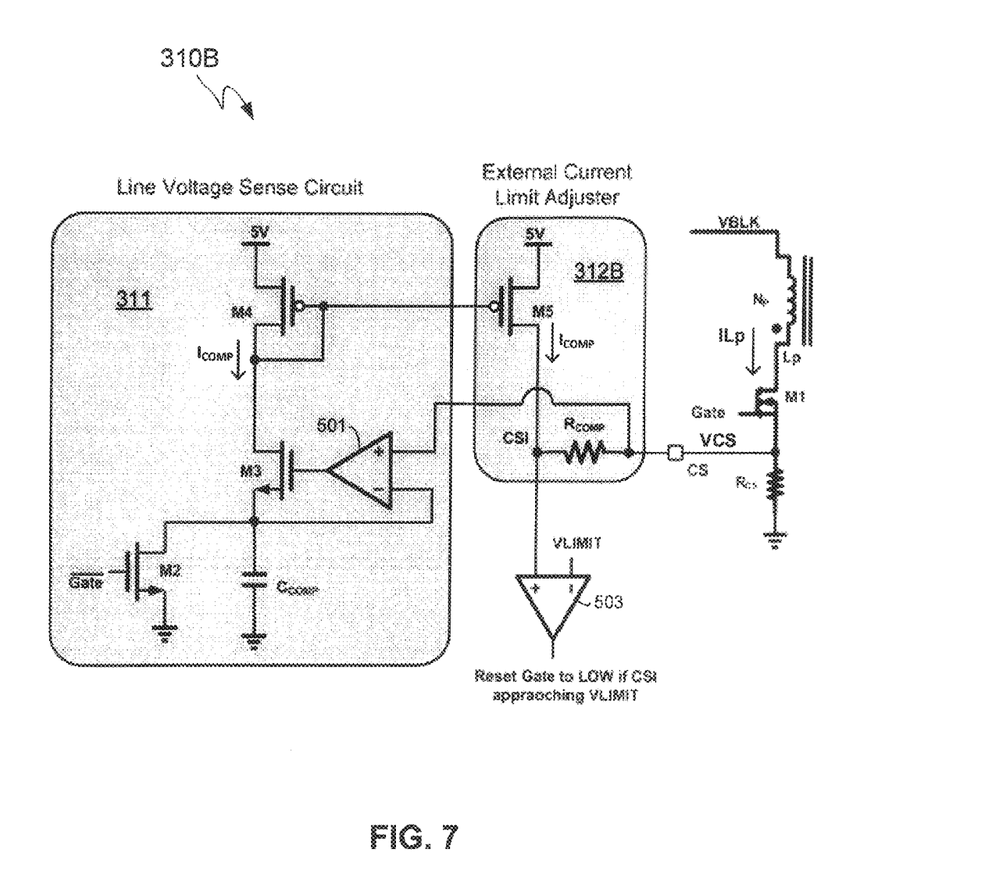
FIG. 7 shows a schematic diagram of a line compensation circuit in accordance with an embodiment of the present invention The use of the same reference label in different drawings indicates the same or like components.

In one embodiment, the line voltage sense circuit 311 senses a slope of the primary-side inductor current via a compensation capacitor CCOMP using the sense voltage VCS and derives a constant compensation current ICOMP from charge variation on the compensation capacitor CCOMP (e.g., see FIGS. 5 and 7). The compensation current ICOMP may be advantageously replicated in the external current limit adjuster 312 and employed to compensate for variations of the AC line voltage and/or input voltage VBLK.

As will be more apparent below, embodiments of the present invention are suitable to different power supply topologies and provide more robust line compensation with respect to accuracy by sensing the slope of the inductor current (or the ratio of the input voltage over the primary winding inductance), allowing for better constant output current and/or power limit control compared to the traditional approach of taking into account only the line voltage.

From FIGS. 2 and 3, the inductor current ILP is given by, $$\Delta ILp = \frac{VBLK}{Lp} \cdot \Delta Ton \qquad \text{(EQ. 4)}$$

The sense voltage VCS is equal to the inductor current ILP multiplied by the sense resistor RCS or $$VCS = \frac{VBLK}{Lp} \cdot \Delta Ton \cdot Rcs \qquad \text{(EQ. 5)}$$

From EQ. 5, it can be seen that the sense voltage VCS is a ramp-up voltage and behaves similar to a constant current that charges a capacitor. In one embodiment, the line voltage sense circuit 311 (see FIG. 4) takes advantage of this observation by including a compensation capacitor CCOMP that is charged by a constant compensation current ICOMP by forcing the sense voltage VCS across the compensation capacitor CCOMP, with the compensation current ICOMP being given by, $$I_{COMP} = C_{COMP} \cdot \frac{\partial VCS}{\partial T} \qquad \text{(EQ. 6)}$$

or $$I_{COMP} = C_{COMP} \cdot \frac{VBLK}{Lp} \cdot Rcs \qquad \text{(EQ. 7)}$$

EQ. 7 indicates that the slope of the inductor current ILP (i.e., VBLK/LP) can be sensed from the compensation current ICOMP. By selecting predetermined values for the compensation capacitor CCOMP and the sense resistor RCS, inductor information (LP) and AC line voltage information (VBLK) can be sensed from the compensation current ICOMP.

FIG. 5 shows a schematic diagram of line compensation circuit 310A in accordance with an embodiment of the present invention. The line compensation circuit 310A is a particular embodiment of the line compensation 310 of FIG. 4. In the example of FIG. 5, the line compensation circuit 310A comprises a line voltage sense circuit 311 and an external current limit adjuster 312A. The external current limit adjuster 312A is a particular embodiment of the external current limit adjuster 312 of FIG. 4. In the example of FIG. 5, the line voltage sense circuit 311 receives the sense voltage VCS, which is coupled across the compensation capacitor CCOMP through a voltage buffer formed by an opamp 501 and a transistor M3. The ramp-up of the sense voltage VCS is thus recreated on the compensation capacitor CCOMP. A compensation current ICOMP is derived from the voltage ramp signal from the compensation capacitor CCOMP. A transistor M2 resets the capacitor CCOMP every cycle by discharging the compensation capacitor CCOMP to ground when the gate of the transistor M2 is active.

In the example of FIG. 5, a current mirror formed by a transistor M4 and a transistor M5 replicates the compensation current ICOMP in the external current limit adjuster 312A. A voltage limit modulator 502 uses the replicated compensation current ICOMP to modulate a VLIMIT threshold voltage (see FIG. 6) to implement line compensation. In one embodiment, the compensation current ICOMP modulates the VLIMIT threshold voltage to be inversely proportional to the AC line voltage to set cycle by cycle current limit. The voltage limit modulator 502 outputs the modulated VLIMIT threshold voltage as a VLIMIT1 threshold. In the example of FIG. 5, a comparator 503 compares the VLIMIT1 threshold voltage to the sense voltage VCS to turn off the transistor M1 and turn on the transistor M2, and thereby reset the compensation capacitor CCOMP when the sense voltage VCS approaches the VLIMIT1 threshold voltage.

Figure 6:
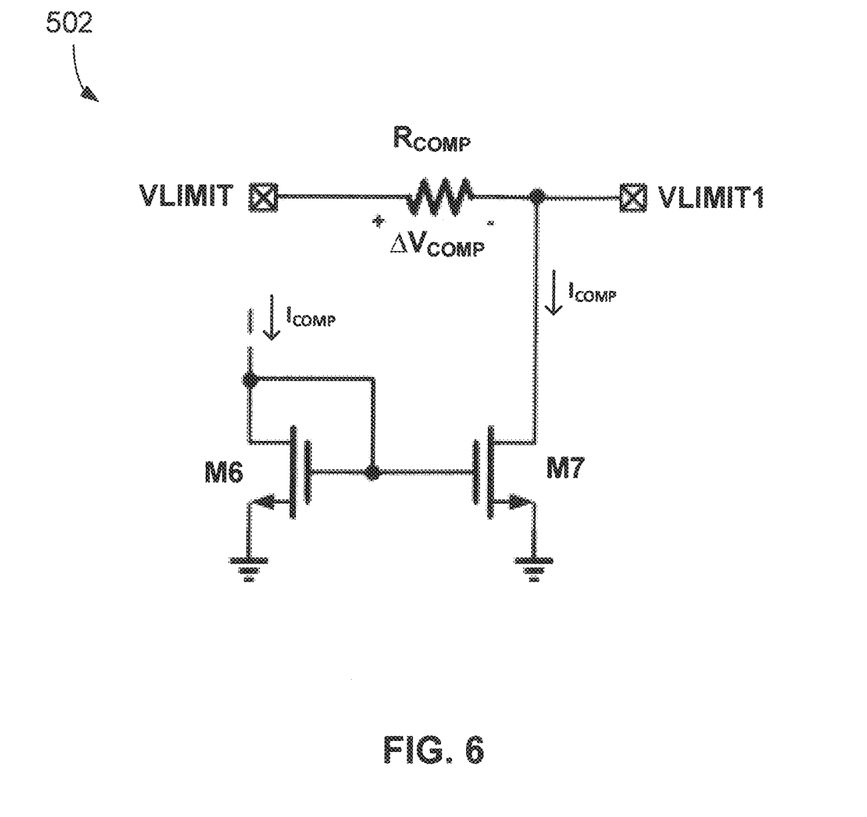
FIG. 6 shows a schematic diagram of a voltage limit modulator in accordance with an embodiment of the present invention.

FIG. 6 shows a schematic diagram of a VLIMIT modulator 502 in accordance with an embodiment of the present invention. In the example of FIG. 6, the VLIMIT modulator 502 receives the VLIMIT threshold voltage. The VLIMIT threshold voltage may indicate the required output current limit, through peak inductor current limit. The VLIMIT threshold voltage may be generated through a constant current control loop or be user-settable for particular applications.

In the example of FIG. 6, the VLIMIT modulator 502 receives the replicated compensation current ICOMP in a transistor M6, which forms a current mirror with a transistor M7 to generate another replicated compensation current ICOMP for modulating the VLIMIT threshold voltage. In the example of FIG. 6, the replicated compensation current ICOMP develops a compensation voltage on the compensation resistor RCOMP. The VLIMIT threshold voltage is input on one end of the resistor RCOMP, the VLIMIT1 threshold voltage is on the other end of the resistor RCOMP, and the line compensation voltage ΔVCOMP is across the resistor RCOMP. The value of the VLIMIT1 threshold voltage thus varies with the compensation current ICOMP.

The line compensation target value is given by, $$IPK, Real \cdot Rcs = VLIMIT \quad (EQ. 8)$$

From EQS. 1, 2, and 3, $$VLIMIT = IPK \cdot Rcs + I_{COMP} \cdot R_{COMP} \quad (EQ. 9)$$

To get ideal line compensation, from EQS. 3, 7, 8, and 9, $$\Delta IPK \cdot Rcs = I_{COMP} \cdot R_{COMP} \quad (EQ. 10)$$

$$\Delta Tdly = R_{COMP} \cdot C_{COMP} \quad (EQ. 11)$$

From EQS. 2, 7, and 10, the amount of line compensation $I_{COMP} \cdot R_{COMP}$ includes the slope m of the inductor current ILP (i.e., VBLK/LP), which tracks the turn-off delay of the transistor M1 induced ΔIPK error. Therefore, by satisfying EQ. 11, ideal line compensation that is more robust with respect to accuracy compared to conventional approaches may be achieved. More particularly, the values of the resistor RCOMP and compensation capacitor CCOMP may be selected to match the turn-off delay of the transistor M1 and thereby compensate for line variations.

FIG. 7 shows a schematic diagram of a line compensation circuit 310B in accordance with an embodiment of the present invention. The line compensation circuit 310B is a particular embodiment of the line compensation circuit 310 of FIG. 4. In the example of FIG. 7, the line compensation circuit 310B comprises the line voltage sense circuit 311 and an external current limit adjuster 312B. The external current limit adjuster 312B is a particular embodiment of the external current limit adjuster 312 of FIG. 4. The line compensation circuit 310B of FIG. 7 is the same as the line compensation circuit 310A of FIG. 5 except for using the external current limit adjuster 312B instead of the external current limit adjuster 312A.

In the example of FIG. 7, the line voltage sense circuit 311 receives the sense voltage VCS to generate the constant compensation current ICOMP as previously explained. A current mirror formed by the transistor M4 and the transistor M5 replicates the compensation current ICOMP in the external current limit adjuster 312B. The replica of the compensation current ICOMP is recreated as a voltage on the compensation resistor RCOMP to set the amount of line compensation as per EQ. 11.

In the example of FIG. 7, the sense voltage VCS is on one end of the compensation resistor RCOMP and the voltage CSI on the other end of the compensation resistor RCOMP. The replicated compensation current ICOMP is received on the same node as the voltage CSI. The comparator 503 compares the VLIMIT threshold voltage to the voltage CSI to turn off the transistor M1 and turn on the transistor M2 and reset the capacitor CCOMP when the voltage CSI approaches the VLIMIT threshold voltage.

Improved power supplies with line compensation circuits have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A line compensation circuit comprising:
   a line voltage sense circuit that receives a sense voltage that is representative of an inductor current on a primary winding of a transformer of a power supply and presents the sense voltage on a compensation capacitor to generate a compensation current that charges the compensation capacitor and is indicative of a slope of the inductor current; and
   a current limit adjuster that uses the compensation current to adjust an output current limit of the power supply by controlling a turn-off of a main switch that is coupled to the primary winding of the transformer.

2. The line compensation circuit of claim 1, wherein the line voltage sense circuit comprises:
   a voltage buffer that receives the sense voltage developed by the inductor current on a sense resistor; and
   a first transistor that forms a current mirror with a second transistor in the current limit adjuster to generate a replica of the compensation current in the current limit adjuster.

3. The line compensation circuit of claim 2, wherein the current limit adjuster modulates a limit threshold voltage with the replica of the compensation current to generate a modulated limit threshold voltage, and wherein a comparator compares the modulated limit threshold voltage to the sense voltage to determine when to turn off the main switch.

4. The line compensation circuit of claim 2, wherein the current limit adjuster further comprises a compensation resistor having a first end coupled to receive the sense voltage and a second end coupled to receive the replica of the compensation current, and wherein a comparator compares a limit threshold voltage with a compensation voltage developed on the second end of the compensation resistor to determine when to turn off the main switch.

5. The line compensation circuit of claim 1, wherein the line voltage sense circuit further comprises a transistor that resets the compensation capacitor when the main switch is turned off.

6. The line compensation circuit of claim 1, wherein the main switch is a MOSFET.

7. The line compensation circuit of claim 1, wherein the line voltage sense circuit comprises:
- an amplifier comprising a positive input terminal coupled to receive the sense voltage; and
- a charging transistor comprising a gate coupled to an output terminal of the amplifier, a source coupled to the compensation capacitor, and a drain, wherein a negative input terminal of the amplifier is coupled to the source of the charging transistor.

8. A method comprising:
- receiving a sense voltage that is indicative of an inductor current that flows through a primary winding of a transformer of a power supply when a main switch that is coupled to the primary winding is on;
- generating from the sense voltage a compensation current that is indicative of the slope of the inductor current; and
- using the compensation current to adjust an output current limit of the power supply.

9. The method of claim 8, wherein the sense voltage is coupled across a compensation capacitor to charge the compensation capacitor with the compensation current.

10. The method of claim 8, wherein using the compensation current to adjust the output current limit of the power supply comprises:
- modulating a limit threshold voltage using the compensation current to generate a modulated limit threshold voltage; and
- comparing the modulated limit threshold voltage to the sense voltage to determine when to turn off the main switch.

11. The method of claim 8, wherein using the compensation current to adjust the output current limit of the power supply comprises:
- mirroring the compensation current to generate a replica of the compensation current;
- modulating a limit threshold voltage with the replica of the compensation current to generate a modulated limit threshold voltage; and
- comparing the modulated limit threshold voltage to the sense voltage to determine when to turn off the main switch.

12. The method of claim 8, wherein using the compensation current to adjust the output current limit of the power supply comprises:
- receiving the compensation current on a first end of a compensation resistor;
- receiving the sense voltage on a second end of the compensation resistor; and
- comparing a limit threshold voltage with a compensation voltage that is developed on the first end of the compensation resistor to determine when to turn off the main switch.

13. The method of claim 12, wherein the compensation current received on the first end of the compensation resistor is mirrored from a charging current that charges a compensation capacitor across, wherein the sense voltage is applied across the compensation capacitor.

14. The method of claim 8, wherein the sense voltage is developed on a sense resistor that receives the inductor current when the main switch is on.

15. A power supply comprising:
- a transformer having a primary winding and a secondary winding, a first end of the primary winding being coupled to receive an input voltage;
- a main switch that is coupled to a second end of the primary winding;
- a current sense resistor that is coupled to the main switch;
- a line voltage sense circuit that is configured to receive a sense voltage on the sense resistor that is indicative of an inductor current that flows through the primary winding when the main switch is on and to use the sense voltage to sense a slope of the inductor current; and
- a current limit adjuster that is configured to adjust an output current limit of the power supply based on the slope of the inductor current.

16. The power supply of claim 15, wherein the line voltage sense circuit comprises a compensation capacitor, and the line voltage sense circuit presents the sense voltage on the compensation capacitor to generate a compensation current that is indicative of the slope of the inductor current.

17. The power supply of claim 16, wherein the line voltage sense circuit presents the sense voltage across the compensation capacitor by way of a voltage buffer.

18. The power supply of claim 16, wherein the current limit adjuster is configured to modulate an output current limit threshold using the compensation current.

19. The power supply of claim 16, wherein the current limit adjuster comprises a compensation resistor having a first end coupled to receive the sense voltage and a second end coupled to receive the compensation current, and wherein a comparator compares a limit threshold voltage with a compensation voltage developed on the second end of the compensation resistor to determine when to turn off the main switch.

20. The power supply of claim 16, wherein the current limit adjuster is configured to receive the compensation current by way of a current mirror.

* * * * *